United States Patent
Reese et al.

(10) Patent No.: US 9,965,349 B2
(45) Date of Patent: *May 8, 2018

(54) IDENTIFYING NETWORK PERFORMANCE ALERT CONDITIONS

(71) Applicant: AT&T Intellectual Property I, L.P., Atlanta, GA (US)

(72) Inventors: Kevin Reese, Fayetteville, GA (US); Alfonso Jones, Suwanee, GA (US); Steven McDonald, Locust Grove, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/689,613

(22) Filed: Apr. 17, 2015

(65) Prior Publication Data

US 2015/0220377 A1    Aug. 6, 2015

Related U.S. Application Data

(63) Continuation of application No. 13/649,446, filed on Oct. 11, 2012, now Pat. No. 9,042,237, which is a (Continued)

(51) Int. Cl.
*G06F 11/07* (2006.01)
*H04L 12/26* (2006.01)
*H04L 12/24* (2006.01)

(52) U.S. Cl.
CPC ........ *G06F 11/079* (2013.01); *G06F 11/0709* (2013.01); *G06F 11/0769* (2013.01);
(Continued)

(58) Field of Classification Search
CPC ...... H04L 41/06–41/0695; H04L 43/06; H04L 43/08–43/0894; H04L 43/50
See application file for complete search history.

(56) References Cited

U.S. PATENT DOCUMENTS 5,740,176 A    4/1998    Gupta et al.
5,808,767 A    9/1998    Williams et al.
(Continued)

OTHER PUBLICATIONS

"Adtran Quad FXS+ Voice Interface Card (1202300L1)," retrieved from <<http://wvvw.mysimon.com/9015-11587_8-20180039.html>>, Jul. 18, 2008, ADTRAN, Inc. Huntsville, Alabama, 2 pages.

(Continued)

*Primary Examiner* — Pao Sinkantarakorn
(74) *Attorney, Agent, or Firm* — Toler Law Group, PC

(57) ABSTRACT

A method includes receiving diagnostic data at a computing system from network interface devices. The method includes analyzing the diagnostic data with the computer system to identify a performance alert condition. The method includes determining, by the computer system, potential causes of the performance alert condition. The method includes determining, by the computer system, probabilities associated with the potential causes being actual causes of the performance alert condition. The method also includes generating, by the computer system, an output including a potential causes list ordered according to the probabilities associated with the potential causes being the actual causes of the performance alert condition.

20 Claims, 5 Drawing Sheets

Related U.S. Application Data continuation of application No. 12/637,707, filed on Dec. 14, 2009, now Pat. No. 8,687,506.

(52) U.S. Cl.
CPC ........ *H04L 41/069* (2013.01); *H04L 41/0645* (2013.01); *H04L 41/0677* (2013.01); *H04L 41/147* (2013.01); *H04L 43/08* (2013.01)

(56) References Cited

U.S. PATENT DOCUMENTS

| | | | |
|---|---|---|---|
| 5,870,667 | A | 2/1999 | Globuschutz |
| 6,018,452 | A | 1/2000 | Meyerhoefer et al. |
| 6,112,232 | A | 8/2000 | Shahar et al. |
| 6,272,151 | B1 | 8/2001 | Gupta et al. |
| 6,684,030 | B1 | 1/2004 | Taylor et al. |
| 6,684,265 | B2 | 1/2004 | Graf |
| 6,807,156 | B1 | 10/2004 | Veres et al. |
| 6,826,156 | B1 | 11/2004 | Sutton et al. |
| 6,847,718 | B1 | 1/2005 | Hiraoka |
| 6,901,530 | B2 | 5/2005 | Cerami et al. |
| 6,961,335 | B1 | 11/2005 | Millet et al. |
| 7,020,249 | B1 | 3/2006 | Haines et al. |
| 7,099,443 | B2 | 8/2006 | Phillips et al. |
| 7,134,135 | B2 | 11/2006 | Cerami et al. |
| 7,180,988 | B2 | 2/2007 | Phillips et al. |
| 7,239,628 | B1 | 7/2007 | Pendleton et al. |
| 8,006,275 | B1 | 8/2011 | Poole et al. |
| 8,085,798 | B2 | 12/2011 | Cha |
| 2002/0009099 | A1 | 1/2002 | D'Onofrio |
| 2002/0105955 | A1 | 8/2002 | Roberts, III et al. |
| 2002/0199203 | A1 | 12/2002 | Duffy et al. |
| 2004/0172657 | A1 | 9/2004 | Phillips et al. |
| 2004/0179541 | A1 | 9/2004 | Godwin |
| 2004/0233860 | A1 | 11/2004 | Campbell et al. |
| 2005/0069029 | A1 | 3/2005 | Afzal |
| 2005/0086694 | A1 | 4/2005 | Hicks et al. |
| 2006/0187071 | A1 | 8/2006 | Kortum et al. |
| 2006/0251094 | A1 | 11/2006 | Van Vleck et al. |
| 2006/0256814 | A1 | 11/2006 | Caci |
| 2007/0217338 | A1 | 9/2007 | Wang et al. |
| 2007/0272440 | A1 | 11/2007 | Grunwald et al. |
| 2008/0089239 | A1 | 4/2008 | Todd et al. |
| 2008/0133978 | A1* | 6/2008 | Angamuthu ........ H04L 41/0645 714/39 |
| 2009/0100492 | A1 | 4/2009 | Hicks, III et al. |
| 2009/0161557 | A1* | 6/2009 | Macias ............... H04L 12/2697 370/242 |
| 2009/0257351 | A1 | 10/2009 | Hande et al. |
| 2009/0259749 | A1* | 10/2009 | Barrett ................ H04L 41/0631 709/224 |
| 2010/0020821 | A1 | 1/2010 | Droms et al. |
| 2010/0023994 | A1 | 1/2010 | Taylor et al. |
| 2010/0071009 | A1 | 3/2010 | Xiu et al. |
| 2010/0083337 | A1 | 4/2010 | Williams et al. |
| 2011/0141921 | A1 | 6/2011 | Reese et al. |

OTHER PUBLICATIONS

"Plug-and-play," retrieved from <<http://en.wikipedia.org/wiki/Plug-and-play>>, Jul. 18, 2008, Wikipedia, the free encyclopedia, San Francisco, California, 2 pages.

"HDSLx and T1 Service Delivery," ADTRAN, <http://www.adtran.com/web/page/portal/Adtran/group/480>, Retrieved Nov. 18, 2009, 1 page.

"Metrobility R105/2105 & R165/2165: T1/E1 Interface Devices," Telco Systems 2005, a BATM Company, <http://www.telco.com/int/index/en/prodbycat/prod/85>, Retrieved Nov. 18, 2009, 1 page.

"RiCi-T1: Fast Ethernet over T1 NTU," RAD, <http://www.rad.com/10/Fast_Ethernet_over_T1_NTU/2541>, Retrieved Nov. 18, 2009, 1 page.

"Time-Domain Reflectometer," <http://en.wikipedia.org/w/index.php?title=Time-domain_reflectometer>, Retrieved Nov. 19, 2009, 4 pages.

\* cited by examiner

IDENTIFYING NETWORK PERFORMANCE ALERT CONDITIONS

CLAIM OF PRIORITY

This application claims priority from, and is a continuation of, U.S. patent application Ser. No. 13/649,446, filed on Oct. 11, 2012, which is a continuation of U.S. patent application Ser. No. 12/637,707, filed on Dec. 14, 2009, now issued as U.S. Pat. No. 8,687,506, each of which incorporated herein by reference in its entirety.

FIELD OF THE DISCLOSURE

The present disclosure is generally related to identifying network performance alert conditions.

BACKGROUND

Improvements in technology have led to an increase in service providers offering so called "triple play" services. Triple play services provide voice, video and data service to a subscriber from a single provider. Offering triple play services that meet customer expectations in an efficient manner can be challenging. For example, service provider networks to provide triple play services may be complicated and expensive to maintain. To illustrate, when network performance is degraded or a network element fails, it can be time consuming to identify the cause or causes of such problems.

DETAILED DESCRIPTION

Figure 1:
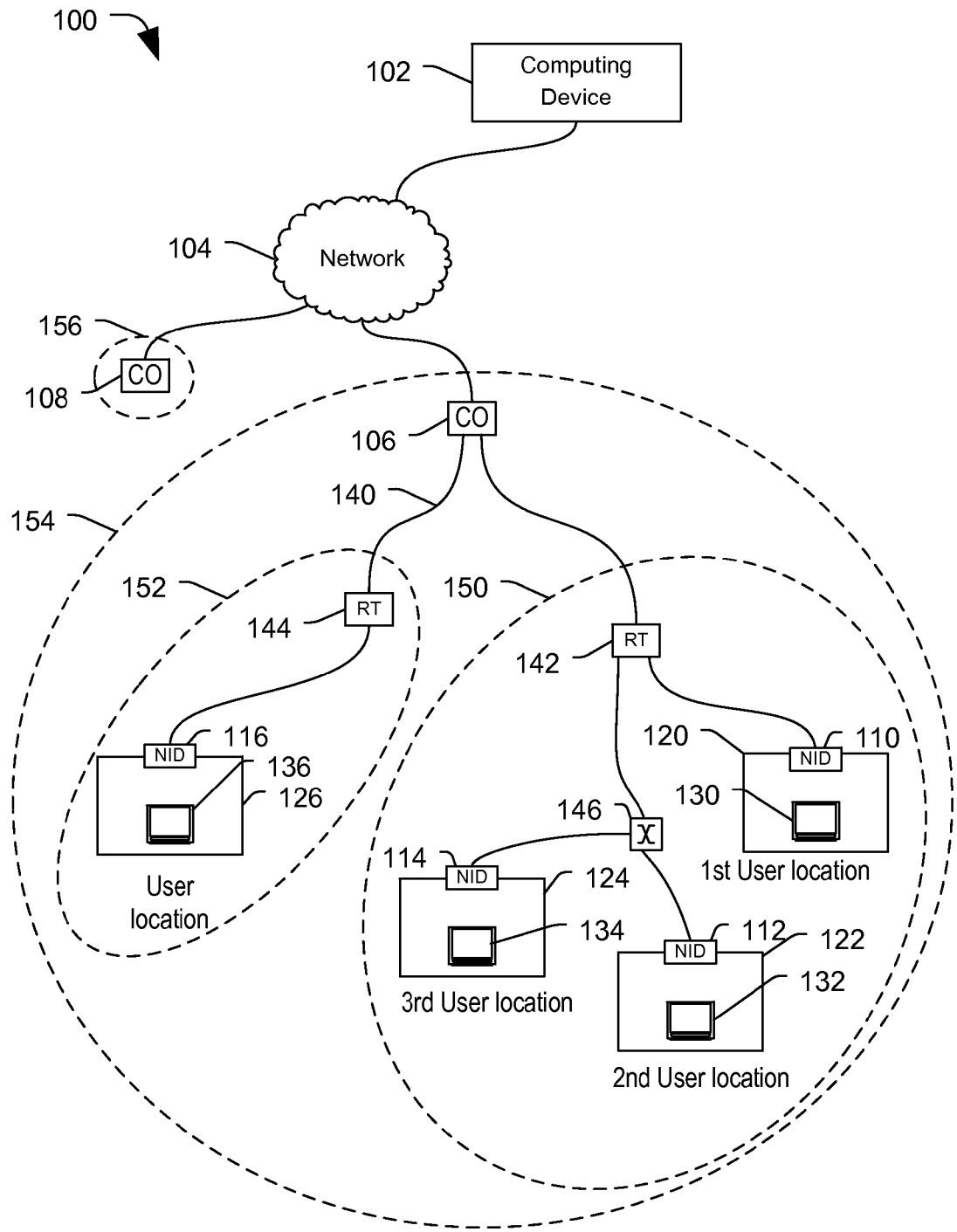
FIG. 1 is a block diagram of a first embodiment of a system to identify network performance alert conditions.

A particular computer-implemented method of identifying performance alert conditions includes receiving diagnostic data from a plurality of network interface devices via a plurality of network connections corresponding to the network interface devices. Each of the plurality of network interface devices includes a diagnostic module to gather diagnostic data pertaining to the network interface device, to gather diagnostic data pertaining to the corresponding network connection, and to gather diagnostic data pertaining to a video device at a user location. The video device is coupled to the network interface device to receive video data via the corresponding network connection. The method also includes analyzing the diagnostic data at a computing device to identify one or more performance alert conditions associated with a service provider network that provides the video data to the plurality of network interface devices via the corresponding network connections. The method further includes generating an output identifying the one or more performance alert conditions.

In a particular embodiment, a network diagnostic device includes a processor and a memory accessible to the processor. The memory includes instructions executable by the processor to cause the processor to receive diagnostic data from a plurality of network interface devices via a plurality of network connections corresponding to the network interface devices. Each of the plurality of network interface devices includes a diagnostic module to gather diagnostic data that pertains to the network interface device, to gather diagnostic data that pertains to the corresponding network connection, and to gather diagnostic data that pertains to a video device at a user location associated with the network interface device. The video device is coupled to the network interface device to receive video data via the corresponding network connection. The instructions are also executable by the processor to cause the processor to analyze the diagnostic data to identify one or more performance alert conditions associated with a service provider network that provides the video data to the plurality of network interface devices via the corresponding network connections. The instructions are further executable by the processor to cause the processor to generate an output identifying the one or more performance alert conditions.

In another particular embodiment, a computer readable storage medium includes instructions executable by a processor to cause the processor to receive diagnostic data from a plurality of network interface devices via a plurality of network connections corresponding to the network interface devices. Each of the plurality of network interface devices includes a diagnostic module to gather diagnostic data that pertains to the network interface device, to gather diagnostic data that pertains to the corresponding network connection, and to gather diagnostic data that pertains to a video device at a user location associated with the network interface device. The video device is coupled to the network interface device to receive video data via the corresponding network connection. The instructions are also executable to cause the processor to analyze the diagnostic data to identify one or more performance alert conditions associated with a service provider network that provides the video data to the plurality of network interface devices via the corresponding network connections. The instructions are further executable to cause the processor to generate an output identifying the one or more performance alert conditions.

FIG. 1 is a block diagram of a first embodiment of a system 100 to identify network performance alert conditions. The system 100 includes a plurality of network interface devices (NIDs) 110, 112, 114 and 116 coupled to a network 104. The NIDs 110, 112, 114 and 116 may be associated with a service provider, such as a triple-play service provider. The NIDs 110, 112, 114 and 116 may be coupled to one or more service provider network elements, such as a central office 106, remote terminals 142 and 144 and one or more cross-connect boxes 146, to receive services. The NIDs 110, 112, 114 and 116 may also be coupled to respective user devices 130, 132, 134, and 136 at respective user locations 120, 122, 124, and 126. The NIDs 110, 112, 114 and 116 may terminate communication connections used by the user devices 130, 132, 134, and 136 to receive data (such as voice data, video data, broadband data, or any combination thereof) from the network 104.

The system 100 also includes a computing device 102. The computing device 102 may be associated with the service provider that provides services to the NIDs 110, 112, 114 and 116. The service provider may use the computing device 102 to monitor performance of a service provider network that includes elements of the network 104, the central offices 106 and 108, the remote terminals 142 and 144, one or more physical links 140 (e.g., wires, cables, fiber optic lines, etc.), the cross-connect box 146, and the NIDs 110, 112, 114 and 116. Additionally, the service provider may use the computing device 102 to monitor performance of devices at the user locations 120, 122, 124, and 126, such as the user devices 130, 132, 134, and 136.

In a particular embodiment, the computing device 102 receives diagnostic data from the NIDs 110, 112, 114 and 116 via a plurality of network connections corresponding to the NIDs 110, 112, 114 and 116. For example, the diagnostic data received from the first NID 110 may include data that pertains to the first NID 110, such as performance of components of the first NID 110 (e.g., operation of a video unit, processor, controller or other device at the first NID 110), data received at the first NID 110, signals received at the first NID 110, and so forth. The diagnostic data received from the second NID 112 may include data that pertains to the second NID 112, such as performance of components of the second NID 112, data received at the second NID 112, signals received at the second NID 112, and so forth. In another example, the diagnostic data received from a particular NID 110, 112, 114 or 116 may pertain to a network connection between the particular NID 110, 112, 114 or 116 and the network 104 or another element of the service provider network. In another example, the diagnostic data received from a particular NID 110, 112, 114 or 116 may pertain to a device at a user location (such as a video device, a telecommunication device, a broadband data device or a computing device) associated with the particular NID 110, 112, 114 or 116. For example, the diagnostic data received from the first NID 110 may include data related to the first user device 130.

The diagnostic data may include any number of factors or parameters that provide information about the performance of the service provider network or elements of the service provider network. For example, the diagnostic data may include data indicating a number of dropped packets at a particular NID 110, 112, 114 or 116 during a specified time period. In another example, the diagnostic data may include results of loopback testing performed with respect to the one or more user devices that are coupled to the particular NID 110, 112, 114 or 116. For example, the first NID 110 may perform loopback testing at the first user location 120 to identify performance conditions. In another example, the diagnostic data may include results of loopback testing performed with respect to the network connection corresponding to the particular NID 110, 112, 114 or 116. In yet another example, the diagnostic data may include data descriptive of signal characteristics of a signal received via the network connection corresponding to the particular NID 110, 112, 114 or 116. For example, the signal may be a communication signal that is modulated to a particular frequency that is used for broadband, video, voice or data communications. The signal characteristics may include signal noise, frequency, signal strength, other characteristics that may be useful to identify line faults, or any combination thereof. In still another example, the diagnostic data may include data indicative of line characteristics of one of the physical links 140 of the network connection corresponding to the particular NID 110, 112, 114 or 116. For example, the data may include an indication of resistance of one or more wires of the physical links 140, results of time-domain reflectometry tests performed on the physical links 140, results of other tests of line characteristics, indications of line breaks, or any combination thereof. In another example, the diagnostic data may include data indicative of bandwidth available to the particular NID 110, 112, 114 or 116 via the network connection corresponding to the particular NID 110, 112, 114 or 116.

The diagnostic data may be received by the computing device 102 periodically or occasionally from one or more of the NIDs 110, 112, 114 and 116. For example, the first NID 110 may send diagnostic data according to a schedule, such as hourly, daily, weekly, monthly or at some other interval. Additionally, or in the alternative, the diagnostic data may be received from one or more of the NIDs 110, 112, 114 and 116 in response to a stimulus. For example, the computing device 102 may send a request for diagnostic data to the third NID 114, which may respond by sending the diagnostic data. In another example, the computing device 102 may send requests for diagnostic data to a set of NIDs. To illustrate, each of the NIDs 110, 112, 114 and 116 may be associated with a service region, such as a neighborhood service region 150 and 152, a metropolitan service region 154, 156 or another service region. The computing device 102 may send requests to each NID associated with a particular service region. In another illustrative example, the computing device may send a request for diagnostic data to a set of NIDs associated with a particular subscriber or a set of NIDs that share a common network element.

In another example, the stimulus may include detection of an event at a particular NID or at a different NID. For example, the event may relate to line characteristics of the physical links 140, signal characteristics, data communication parameters (e.g., packet loss, available bandwidth, jitter), a diagnostic request from a user (e.g., a request issued from one of the user devices 130, 132, 134, 136 at the corresponding user locations 120, 122, 124, 126), other operational parameters, or any combination thereof. To illustrate, the first NID 110 may send diagnostic data in response to a particular packet loss threshold being reached at the first NID 110 or at another NID 112, 114, 116 in a service region 150 and 154 with the first NID 110.

The NID 110, 112, 114, and 116 may also gather the diagnostic data periodically, occasionally, or in response to a stimulus (such as a request or detection of an event). For example, the diagnostic data may be gathered according to a schedule and stored at a memory of the corresponding NID 110, 112, 114, or 116 until it is sent to the computing device 102. In another example, the diagnostic data may not be gathered until it is to be sent to the computing device 102.

The computing device 102 may analyze the diagnostic data to identify one or more performance alert conditions associated with the service provider network. For example, the computing device 102 may use the diagnostic data to identify two or more NIDs 110, 112, 114, and 116 within a service region where the diagnostic data received from the two or more NIDs 110, 112, 114, and 116 indicate a particular alert condition. When this situation arises, at least one common network element that is shared by the connections corresponding to the two or more NIDs 110, 112, 114, and 116 may be identified. To illustrate, when the second NID 112 and the third NID 114 each provide diagnostic data that are associated with a particular alert condition, the computing device 102 may determine that the cross-connect box 146 and the remote terminal 142 are common network elements shared by the second NID 112 and the third NID 114. The computing device 102 may request diagnostic data from the first NID 110 if the diagnostic data is not already available from the first NID 110. The computing device 102 may be able to eliminate the cross connect box 146 or the remote terminal 142 from a list of possible causes of the particular alert condition based on the diagnostic data from the first NID 110.

The computing device 102 may analyze the diagnostic data by comparing values of the diagnostic data to one or more threshold values to determine whether one or more operational criteria are satisfied. The threshold values may relate to line characteristics of the physical links 140, signal characteristics, data communication parameters (e.g., packet loss, available bandwidth, jitter), other operational parameters, or any combination thereof. One or more performance alert conditions may be identified when the values of the diagnostic data do not satisfy the one or more threshold values. Additionally, or in the alternative, the computing device 102 may analyze the diagnostic data by comparing values of the diagnostic data to one or more historical values to identify performance degradation trends. The historical values may relate to line characteristics of the physical links 140, signal characteristics, data communication parameters (e.g., packet loss, available bandwidth, jitter), other operational parameters, or any combination thereof. The historical values may be based on measurements associated with a particular NID 110, 112, 114, or 116, or measurements associated with a plurality of NIDs, such as all of the NIDs 110, 112, 114, and 116, or a subset of the NIDs 110, 112, 114, and 116. One or more performance alert conditions may be identified when one or more performance degradation trends are identified. For example, when bandwidth available to a particular NID is determined to have decreased over a period of time, a performance alert condition associated with the decreasing bandwidth may be identified.

Based on the analysis of the diagnostic data, the computing device 102 may identify a list of potential causes of the one or more identified performance alert conditions. The computing device 102 may also determine a probability of each of the potential causes being an actual cause of the one or more identified performance alert conditions. The list of potential causes, the probability of each being the actual cause, or both may be determined based on historical information related to the communication network. For example, after troubleshooting the communications network to identify the actual cause of a particular alert condition, a technician or other party associated with the service provider may generate a data record that links a particular set of diagnostic data to the identified actual cause. The computing device 102 may also determine an approximate location of a cause of the one or more identified performance alert conditions. For example, the approximate location of the cause of the performance alert conditions may be determined based on an aggregate analysis of the diagnostic data received from two or more of the NIDs 110, 112, 114, and 116.

The computing device 102 may determine one or more responsible parties associated with the one or more identified performance alert conditions. For example, a technician or technician group associated with the one or more identified performance alert conditions may be selected based on a type of the one or more identified performance alert conditions, based on the approximate location of the cause, based on other factors (such as a time of day), or any combination thereof.

The computing device 102 may generate an output identifying the one or more performance alert conditions. For example, the output may include a listing of the one or more identified performance alert conditions. In an illustrative embodiment, the output also includes a list of potential causes ordered according to the probability of each of the potential causes being the actual cause of the one or more identified performance alert conditions. The output may also include the approximate location of one or more of the potential causes. In a particular embodiment, the output is sent to an output device associated with the one or more responsible parties. For example, the output may be sent to a computer terminal, portable notification device (e.g., a mobile phone, pager or portable work terminal) or a printer associated with the technician or technician group responsible to address the performance alert condition.

Figure 2:
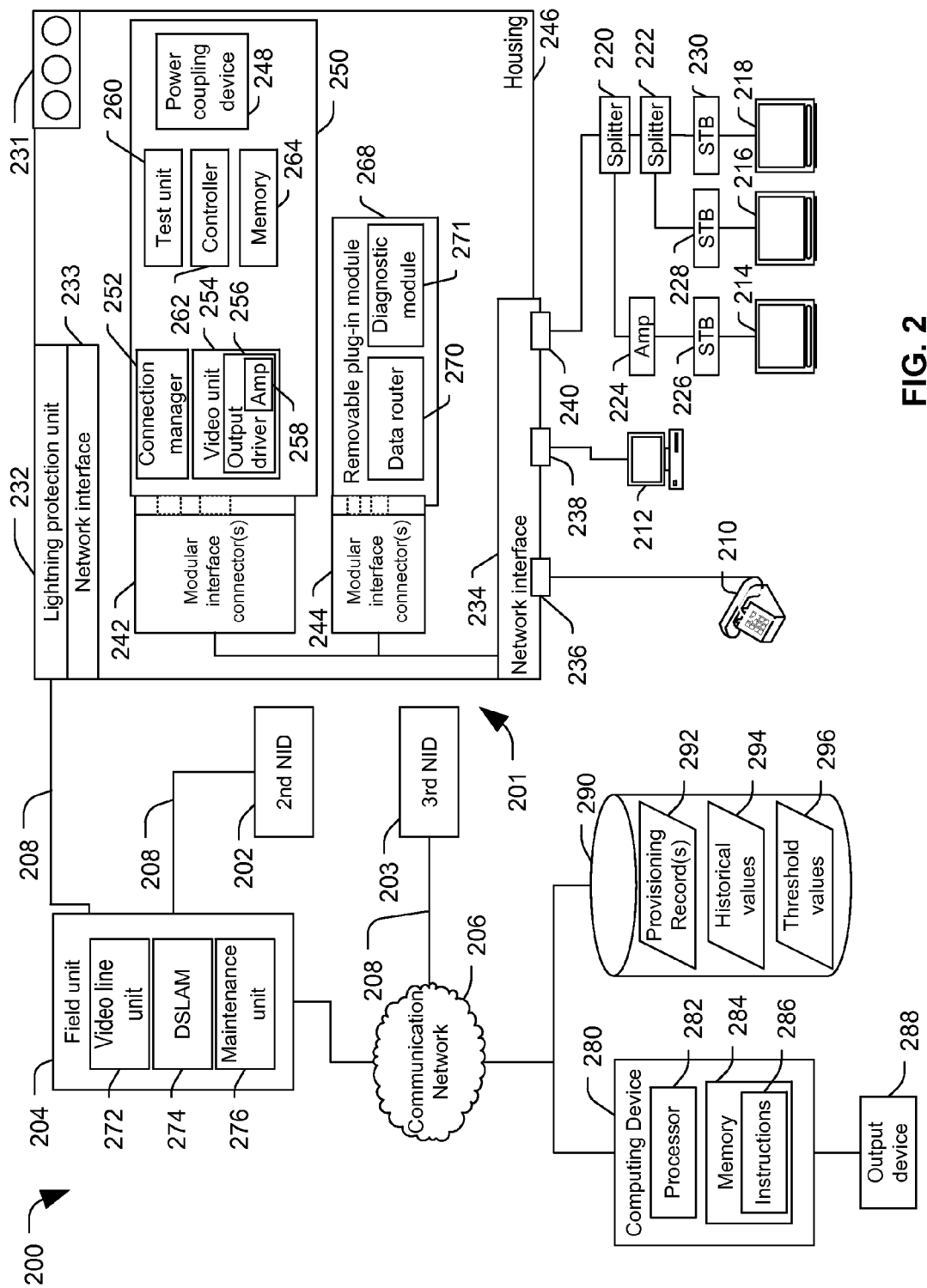
FIG. 2 is a block diagram of a second embodiment of a system to identify network performance alert conditions.

FIG. 2 is a block diagram of a second embodiment of a system to identify network performance alert conditions. The system is designated generally 200. The system 200 includes a plurality of network interface devices 201-203 coupled to a communication network 206. For example, the communication network 206 may be associated with a provider of triple play services. The network interface devices 201-203 may be attached to an exterior of a customer premise, such as a residence, business or another user location, to terminate communication lines from the communication network 206 and to terminate communication lines from the customer premise. One or more of the network interface devices 201-203 may be connected to the communication network 206 via a field unit 204, such as a remote terminal or a cross-connect box.

The network interface devices 201-203 may be similar or dissimilar to one another. To simplify the description, only one of the network interface devices 201-203 (e.g., the network interface device 201) is described in detail here; however, the other network interfaces devices 202, 203 may have similar features and functions. The network interface device 201 is adapted to receive data from the communication network 206 and to distribute the data to devices at a customer residence. For example, the devices to which the data are distributed may include one or more telephones 210, one or more computers 212, one or more display devices 214, 216 and 218, one or more set-top box devices 226, 228 and 230, or any combination thereof. The data may include voice, video or computer data (e.g., broadband data). The network interface device 201 may send the data to the devices via one or more intermediate devices. For example, video data may be provided to the one or more display devices 214, 216 and 218 via one or more splitters 220 and 222, one or more amplifiers 224, the one or more set-top box devices 226, 228 and 230, or any combination thereof.

The network interface device 201 may include a housing 246 adapted to provide climate protection to components housed therein. In a particular embodiment, the housing 246 may also be adapted to restrict access to one or more portions of the network interface device 201. For example, the network interface device 201 may include a customer accessible portion and a service provider accessible portion. The network interface device 201 may also include a lightning protection unit 232. The lightning protection unit 232 may include lightning protection coils adapted to protect electronic equipment within the network interface device 201 (at the customer's residence) from harmful effects of a lightning strike at the communication network 206, the field unit 204, the network interface device 201, or any connection point or communication line there between.

In a particular embodiment, the network interface device 201 includes a first network interface 233 including one or more connectors to terminate one or more communication lines 208 from the communication network 206. The communication lines 208 may include one or more twisted pair lines (e.g., telephone lines), one or more non-twisted lines (e.g., a T-2 line, an E-2 line or a coaxial cable line), fiber optic lines, coaxial cables, or any combination thereof. The network interface device 201 also includes a second network interface 234 including one or more connectors 236, 238 and 240 to terminate communication lines of the customer premise. The connectors 236, 238 and 240 may include one or more connectors for a twisted pair line, a non-twisted pair line, and a coaxial cable line. For example, the connectors may include a standard telephone jack (e.g., an RJ11 jack), an Ethernet jack (e.g., an RJ45 jack), a coaxial line connection (e.g., an F connector), or any other local network connector to connect a wiring system at the customer premise to the network interface device 201.

In a particular embodiment, the network interface device 201 includes one or more modular interface connectors 242, 244. The modular interface connectors 242, 244 may be adapted to receive one or more removable plug-in modules 250 and 268 that provide particular functionality to the network interface device 201. In an illustrative embodiment, when no removable plug-in modules are provided, the network interface device 201 may provide access only to voice service (e.g., telephone service) at the customer residence. Either video service (e.g., television), broadband data service (e.g., computer data communications), or both may be conveniently added to the network interface device 201 via the one or more removable plug-in modules 250 and 268. In other embodiments, other services or combinations of services available via the communication network 206 can be provided by the network interface device 201 alone or by the network interface device 201 in combination with the one or more removable plug-in modules 250 and 268. For example, the network interface device 201 alone (i.e., without any removable plug-in modules) may not provide access to any of the services of the communication network 206. In another example, one of the removable plug-in modules 250 and 268 may provide access to voice, video and data services.

In the particular example illustrated in FIG. 2, the first modular interface connector 242 is adapted to receive the first removable plug-in module 250. The first removable plug-in module 250 may include a video unit 254 to access video services available via the communication network 206. When the first removable plug-in module 250 is coupled to the first modular interface connector 242, the video unit 254 may be enabled to receive video data from the field unit 204 via the one or more communication lines 208 and to process the video data for communication via at least one coaxial line or at least one twisted pair line to the one or more display devices 214, 216 and 218. In a particular embodiment, the video unit 254 may include an output driver 256 adapted to communicate the processed video data via wiring at the customer premise (e.g., one or more coaxial lines or one or more twisted pair lines) to at least one of the set-top box devices 226, 228 and 230 for display at one or more of the display devices 214, 216 and 218.

In an illustrative embodiment, the video data may include Internet Protocol Television (IPTV) data. The video data may be communicated from a video line unit 272 of the field unit 204. The video line unit 272 may modulate the video data and communicate the modulated video data via the one or more communication lines 208 to the network interface device 201. At the network interface device 201, the video unit 254 may demodulate the video data to communicate the data via the second network interface 234 to one or more devices at the customer premise. In a particular embodiment, the video line unit 272 modulates the video data in accordance with a very high-speed digital subscriber line (VDSL) protocol and the video unit 254 demodulates the modulated video data to generate a home telephone line network alliance (HPNA) protocol signal for communication via the second network interface 234 to devices at the customer premise.

In a particular embodiment, the output driver 256 may include a signal amplifier 258. The signal amplifier 258 may be adapted to amplify the processed video signal for communication to the one or more user devices coupled to the second network interface 234. In an illustrative embodiment, the network interface device 201 and the display devices 214, 216 and 218 at the customer premise are coupled to a pre-existing coaxial cable network (i.e., a coaxial cable network that was installed at the customer premise before the network interface device 201 was installed at the customer premise). In this embodiment, the coaxial cable network may include one or more communication paths that are not direct paths between the network interface device 201 and the display devices 214, 216 and 218 or the set top box devices 226, 228 and 230. For example, the coaxial cable network may include the splitters 220 or 222, the amplifier 224, or other devices (not shown). The signal amplifier 258 may be adapted to amplify the signal sufficiently to communicate the amplified signal to the set-top box devices 226, 228 and 230 or the display devices 214, 216 and 218 for display.

In a particular embodiment, the first removable plug-in module 250 may include a connection manager 252. The connection manager 252 may be operable to manage a connection to the communication network 206 via the one or more communication lines 208. For example, the connection manager 252 may be operable to communicate with the video line unit 272, a digital subscriber line modem (DSLAM) 274 or another component of the field unit 204 to condition the one or more communication lines 208 for data communication.

In a particular embodiment, the first removable plug-in module 250 includes a controller 262. The controller 262 may be adapted to detect connection of the first removable plug-in module 250 to the first modular interface connector 242. In response to detecting connection of the first removable plug-in module 250 to the first modular interface connector 242, the controller 262 may automatically initialize video data processing at the video unit 254. Thus, when the first removable plug-in module 250 is connected to the first modular interface connector 242, the first removable plug-in module 250 may be automatically initiated and may automatically initiate communication with the communication network 206 to allow functionality of the first removable plug-in module 250 to be accessible to the user.

In a particular embodiment, the first removable plug-in module 250 may also include a test unit 260. The test unit 260 may be adapted to loop signals received from the field unit 204 back to the field unit 204 in response to a signal received from the communication network 206 of the diagnostic module 271. For example, the test unit 260 may loopback the signals in response to a loopback test signal received from a maintenance unit 276 of the field unit 204 or from the communication network 206. Loopback testing may enable the maintenance unit 276 to identify communication problems between the field unit 204 and the first removable plug-in module 250, or between the communication network 206 and the first removable plug-in module 250.

In a particular embodiment, the test unit 260 may be operable to execute function testing of other components of the first removable plug-in module 250, another removable plug-in module (e.g., the second removable plug-in module 268), another component of the network interface device 201, a device at the customer premise (such as one of the set-top box devices 226-230), or any combination thereof. In an illustrative embodiment, a diagnostic module 271 communicates results of the testing to the maintenance unit 276 or to a computing device 280 for analysis and follow-up (e.g., to dispatch an appropriate technician to repair a detected problem). In a particular embodiment, the computing device 280 is the computing device 102 of FIG. 1. In another illustrative embodiment, the diagnostic module 271 stores performance and diagnostic data associated with the tested components at a memory 264. The diagnostic module 271 may analyze the performance and diagnostic data and communicate results of the analysis to the maintenance unit 276 or the computing device 280. For example, analyzing the performance and diagnostic data may include comparing the data to one or more operational criteria associated with a particular component to identify one or more operational concerns before the operational concern becomes perceptible by a user at the customer premise. The diagnostic module 271 may also be adapted to provide a status display indicating whether one or more communication problems or other operational concerns have been identified. For example, the network interface device 201 may include a visual status display 231, such as red, yellow and green lights that indicate whether the network interface device 201 or one or more components of the network interface device 201 are functioning properly and able to communicate with the communication network 206.

In a particular embodiment, the network interface device 201 and the one or more removable plug-in modules 250 and 268 may be line powered. For example, the first removable plug-in module 250 may include a power coupling device 248. The power coupling device 248 may be adapted to receive power via the one or more communication lines 208 from the communication network 206. The power coupling device 248 may provide operating power to the network interface device 201 and to one or more of the components of the network interface device 201 (e.g., the first removable plug-in module 250, the second removable plug-in module 268, the visual status display 231, other removable plug-in modules or other components, or any combination thereof). By providing line power via one or more of the removable plug-in modules 250 and 268, no additional power interface may be required for the network interface device 201. For example, no other connection to a power source outside the network interface device 201 may be required. Additionally, by providing line power via one or more of the removable plug-in modules 250 and 268, the network interface device 201 may remain unpowered until the one or more removable plug-in modules 250 and 268 are connected to modular interface connectors 242 and 244. In a particular illustrative embodiment, each removable plug-in module 250 and 268 may include a power coupling device to provide line power for itself and/or one or more other components of the network interface device 201.

In a particular embodiment, the network interface device 201 includes the second modular interface connector 244. The second modular interface connector 244 may be adapted to receive a second removable plug-in module 268. The second removable plug-in module 268 may enable other functionality at the network interface device 201. For example, where the first removable plug-in module 250 enables access to video services, the second removable plug-in module 268 may enable access to voice services or computer data communications. In another example, other functionality may be enabled via the second removable plug-in module 268, for example administrative functions, such as line conditioning, testing, performance monitoring, diagnostics, power coupling, or other functions of the connection manager 252, the test unit 260, the controller 262, the memory 264, the power coupling device 248, or any combination thereof may be provided via the second removable plug-in module 268.

In a particular embodiment, the second removable plug-in module 268 includes a data router 270. The data router 270 may be adapted to receive communication data via the one or more communication lines 208 from the communication network 206 and to route the communication data to one or more devices connected to the second network interface 234. For example, the data router 270 may receive voice data (e.g., plain old telephone service or voice over Internet protocol data) from the communication network 206 and communicate the voice data to the telephone 210. In another example, the data router 270 may receive broadband data (e.g., Internet protocol data) from the communication network 206 and route the broadband data to the computer 212. In still another example, the data router 270 may receive video data (e.g., IPTV data) from the communication network 206 and route the video data to the one or more display devices 214, 216 and 218 or the one or more set-top box devices 226, 228 and 230. In a particular illustrative embodiment, the data router 270 may be included on the first removable plug-in module 250, accordingly the first removable plug-in module 250 may provide video processing capability as well as data routing capability to the network interface device 201. In another particular embodiment, the data router 270, the video unit 254, the connection manager 252, the test unit 260, the controller 262, the memory 264, the diagnostic module 271 and the power coupling device 248 may be on any combination of the removable plug-in modules 250 and 268 allowing any combination of functionality to be provided to the network interface device 201 based on a particular configuration desired.

In a particular embodiment, the controller 262 is adapted to send a provisioning request to the communication network 206 in response to detecting connection of a removable plug-in module to one of the modular interface connectors 242 and 244. In response to the provisioning request, the communication network 206 may store a provisioning record 292 at a database 290 associated with the communication network 206. The provisioning record 292 may associate an identification for the removable plug-in module 250 or 268 with a subscriber account associated with the customer premise. The provisioning record 292 may enable provision of communication services (e.g., voice, video and/or data services) via the removable plug-in module 250 or 268 to the customer premise.

The diagnostic module 271 may send diagnostic data to the computing device 280 periodically, occasionally, or in response to a stimulus. The diagnostic data may include information about the performance of the network interface device 201, one or more of the user devices (such as the telephone 210, one of the set-top box devices 226, 228, 230, one or more of the televisions 214, 216, 218), the one or more communication lines 208, the field unit 204, or any combination thereof.

The computing device 280 may include a processor 282 and a memory 284 accessible to the processor 282. The memory 284 may include instructions 286 that are executable by the processor 282 to receive the diagnostic data from one or more of the network interface devices 201-203 and to analyze the diagnostic data. For example, the computing device 280 may identify one or more performance alert conditions based on the diagnostic data received from the network interface devices 201-203. To illustrate, the computing device 280 may compare values of the diagnostic data to one or more historical values 294, one or more threshold values 296, or both to identify performance alert conditions. The computing device 280 may also identify one or more potential causes of the performance alert conditions and a party responsible for the performance alert conditions. The computing device 280 may send an output identifying the performance alert conditions, the potential causes of the performance alert conditions, the locations of the potential causes, other information about the performance alert conditions, or any combination thereof to an output device 288. The output device 288 may be associated with the party responsible for the performance alert conditions, such as a technician or technician group responsible to correct the performance alert conditions.

Figure 3:
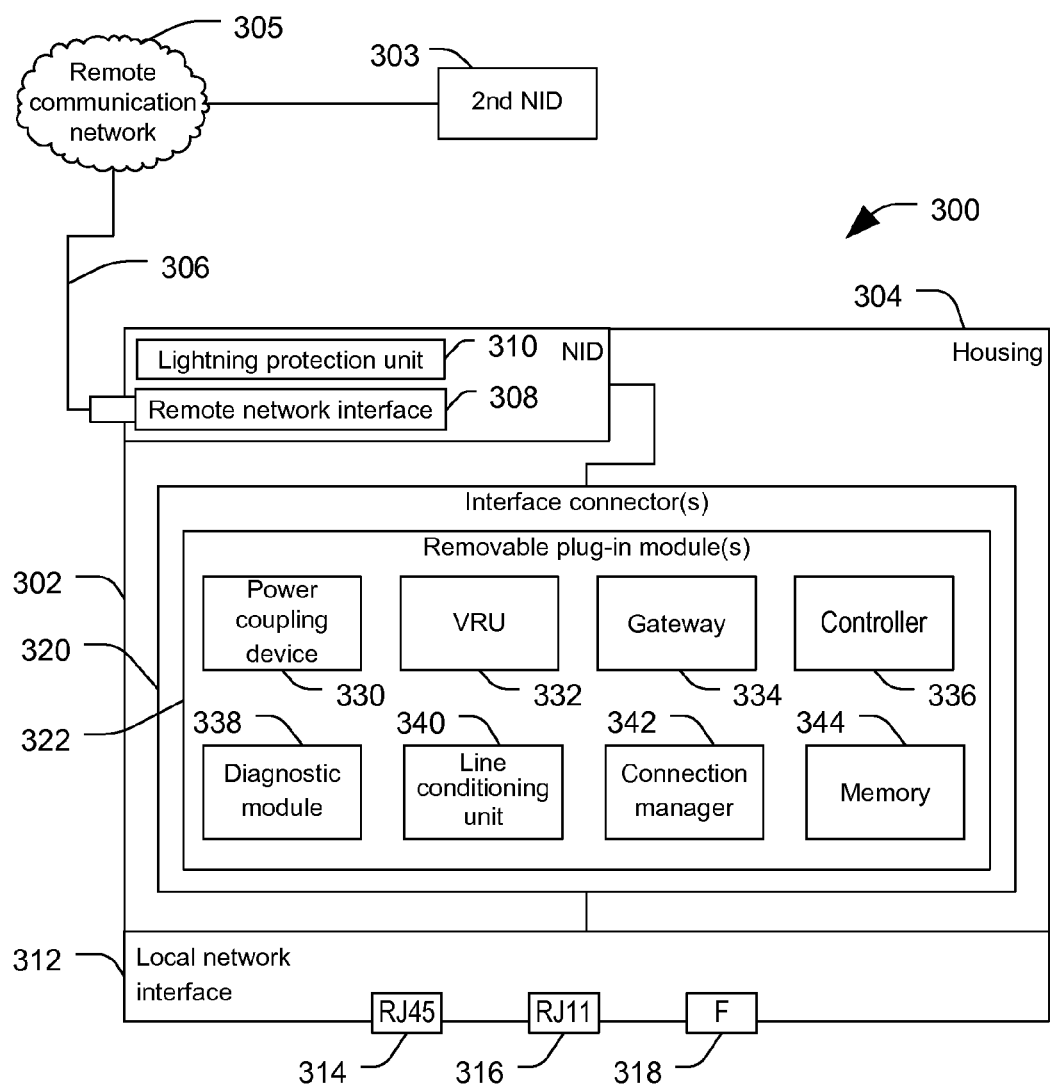
FIG. 3 is a block diagram of a third embodiment of a system to identify network performance alert conditions.

FIG. 3 is a block diagram of a third embodiment of a system to identify network performance alert conditions. The system is generally designated 300. The system 300 includes a plurality of network interface devices 302, 303 coupled to a remote communication network 305. For example, the remote communication network 305 may be associated with a provider of triple play services. The network interface devices 302, 303 may be similar or dissimilar to one another. To simplify the description, only one of the network interface devices 302 is described in detail here; however, the other network interface device 303 may have similar features and functions.

The network interface device 302 is adapted to receive data from the remote communication network 305 and to distribute the data to devices at a customer residence. One or more communication lines 306 may couple the network interface device 302 to the remote communication network 305. The communication lines 306 may include one or more twisted pair communication lines (e.g., telephone lines), one or more non-twisted pair communication lines (e.g., a T-1 line, an E-1 line or a coaxial communication line), or any combination thereof.

The network interface device 302 includes a housing 304 to provide physical protection to one or more components of the network interface device 302. The network interface device 302 may also include a lightning protection unit 310 and a remote network interface 308. The remote network interface 308 and lightning protection unit 310 may be coupled to the communication lines 306 to provide protection against lightning strikes and to terminate the communication lines 306. The network interface device 302 may also include one or more local network interfaces 312 to terminate one or more connections to wiring at a customer premise. For example, the local network interface 312 may include a number of interface connectors adapted to communicate data to various user devices at a customer premises. The interface connectors may include one or more modular sockets, plugs or jacks to terminate one or more twisted pair lines. For example, the interface connectors may include RJ45 jacks 314, RJ11 jacks 316, RJ14 jacks (not shown), RJ25 jacks (not shown) or any other six position or eight position plug jacks or other modular connector. The local network interface 312 may also include one or more connectors for other types of communication lines, such as coaxial cables. For example, the local network interface 312 may include one or more F connectors 318 to terminate one or more coaxial cable lines. In an illustrative embodiment, the local network interface 312 may terminate connections to wiring at the customer premise to provide voice data to one or more telephones via a modular telephone connector, to provide computer data (e.g., broadband data communications) to one or more computers via one or more Ethernet or data network connectors (such as the RJ45 connector), and to provide video data to one or more display devices via one or more coaxial connectors or twisted wire pair connectors.

In a particular embodiment, the network interface device 302 includes one or more interface connectors 320. The interface connectors 320 may be adapted to receive one or more removable plug-in modules 322. The removable plug-in modules 322 may include any combination of modules that provide line power, video processing, data routing, diagnostics, line conditioning, memory, connection management or other functionality to the network interface device 302. In an illustrative embodiment, the removable plug-in modules 322 may include a power coupling device 330 adapted to receive power via the one or more sets of communication lines 306 and to provide operating power to other components within the network interface device 302, such as, for example, a gateway 334, a line conditioning unit 340, a video unit 332, a diagnostic module 338, a connection manager 342, a controller 336, or any combination thereof.

In a particular embodiment, the removable plug-in modules 322 may include a video unit 332 (also called a video remote unit or "VRU"). The video unit 332 may be adapted to receive video data from the remote communication network 305 via the one or more communication lines 306. The video unit 332 may process the video data for communication via the at least one coaxial connectors 318 or one or more other connectors at the local network interface 312. For example, the video unit 332 may receive modulated video data via the communication line 306 and may demodulate the video data for distribution via the local network interface 312.

The gateway module 334 may route data received via the remote communication network 305 to one or more devices coupled to the local network interface 312. For example, the gateway 334 may include a residential gateway adapted to provide network address translation (NAT) for devices coupled to the local network interface 312. The gateway module 334 may route the data based at least partially on a type of the data. For example, voice data may be routed to a telephone or voice over Internet protocol device coupled to the local network interface 312. In another example, broadband communication data (e.g., Internet protocol data, transmission control protocol data, or data in another computer-to-computer communication protocol) may be routed to a computing device coupled to the local network interface 312. In still another example, video data may be routed to the video unit 332 for processing or from the video unit 332 to one or more display devices or set-top box devices for display.

In a particular embodiment, the removable plug-in modules 322 include the controller 336. The controller 336 may be adapted to detect when one or more removable plug-in modules 322 are coupled to the interface connectors 320 and to automatically enable service to the one or more removable plug-in modules 322. For example, when the controller 336 detects that the video unit 332 has been plugged into the interface connectors 320, the controller 336 may send a provisioning request via the communication lines 306 to store a provisioning record at the remote communication network 305. The provisioning record may be used by the remote communication network 305 to enable provisioning of video data to the video unit 332.

The diagnostic module 338 is adapted to monitor performance of one or more of the removable plug-in modules 322, other component of the network interface device 302, the communication lines 306, other elements of the remote communication network 305, devices coupled to the local network interface 312, or any combination thereof. In an illustrative embodiment, the diagnostic module 338 is adapted to initiate loop back testing of the communication line 306 and network interface device 302 in response to a request received via communication line 306. In another illustrative embodiment, the diagnostic module 338 is adapted to provide a visual display or other information to indicate an operational status of the network interface device 302, one or more components of the network interface device 302, communications with the remote communication network 305, or any combination thereof. For example, the diagnostic module 338 may be adapted to activate a green, yellow or red light to indicate whether the network interface device 302 and components therein are functioning properly. The diagnostic module 338 may send diagnostic data to a remote computing device via the communication lines and the remote communication network 305. In a particular embodiment, the remote computing device is the computing device 102 of FIG. 1 or the computing device 280 of FIG. 2. The remote computing device may identify performance alert conditions associated with the network interface device 302, devices coupled to the network interface device 302 or elements of the remote communication network 305 based on the diagnostic data.

In a particular embodiment, the removable plug-in modules 322 may include a line conditioning unit 340. The line conditioning unit 340 is adapted to condition the communication lines 306 for data communications. In a particular embodiment, the line conditioning unit 340 operates in conjunction with a remote line conditioning unit at the remote communication network 305 to condition the communication lines 306. The removable plug-in modules 322 may also include a connection manager 342. The connection manager 342 is adapted to manage a data communication connection between the network interface device 302 and the remote communication network 305.

In a particular embodiment, the removable plug-in modules 322 include one or more memory devices 344. The memory devices 344 may be adapted to store performance or diagnostic data related to one or more of the components of the network interface device 302. In a particular embodiment, each of the one or more removable plug-in modules 322 stores its performance data at the memory 344. In another particular embodiment, the controller 336 polls the one or more removable plug-in modules 322 to gather the performance data and to store the gathered performance data at the memory 344. In still another particular embodiment, the diagnostic module 338 determines performance data related to one or more components of the network interface device 302 and stores the performance data as diagnostic data at the memory 344. In yet another particular embodiment, the diagnostic module 338 determines performance data related to one or more components of the network interface device 302 and analyzes the performance data. The diagnostic unit 338 stores the analyzed performance data at the memory 344 for communication via the communication line 306 to the remote computing device via the remote communication network 305.

The one or more removable plug-in modules 322 may be arranged in any configuration, form factor, or combination. For example, any one or more of the video unit 332, the gateway 334, the power coupling device 330, the diagnostic module 338, the line conditioning unit 340, the connection manager 342, the controller 336, and the memory 344 may be on a single module, such as an interface card. In another example, the gateway 334 and the video unit 332 may be on separate modules. In yet another example, the removable plug-in modules 322 may include a number of interface cards. Each of the interface cards may include its own power coupling device, memory, controller, diagnostic module, line conditioning unit, connection manager, or any combination thereof.

Figure 4:
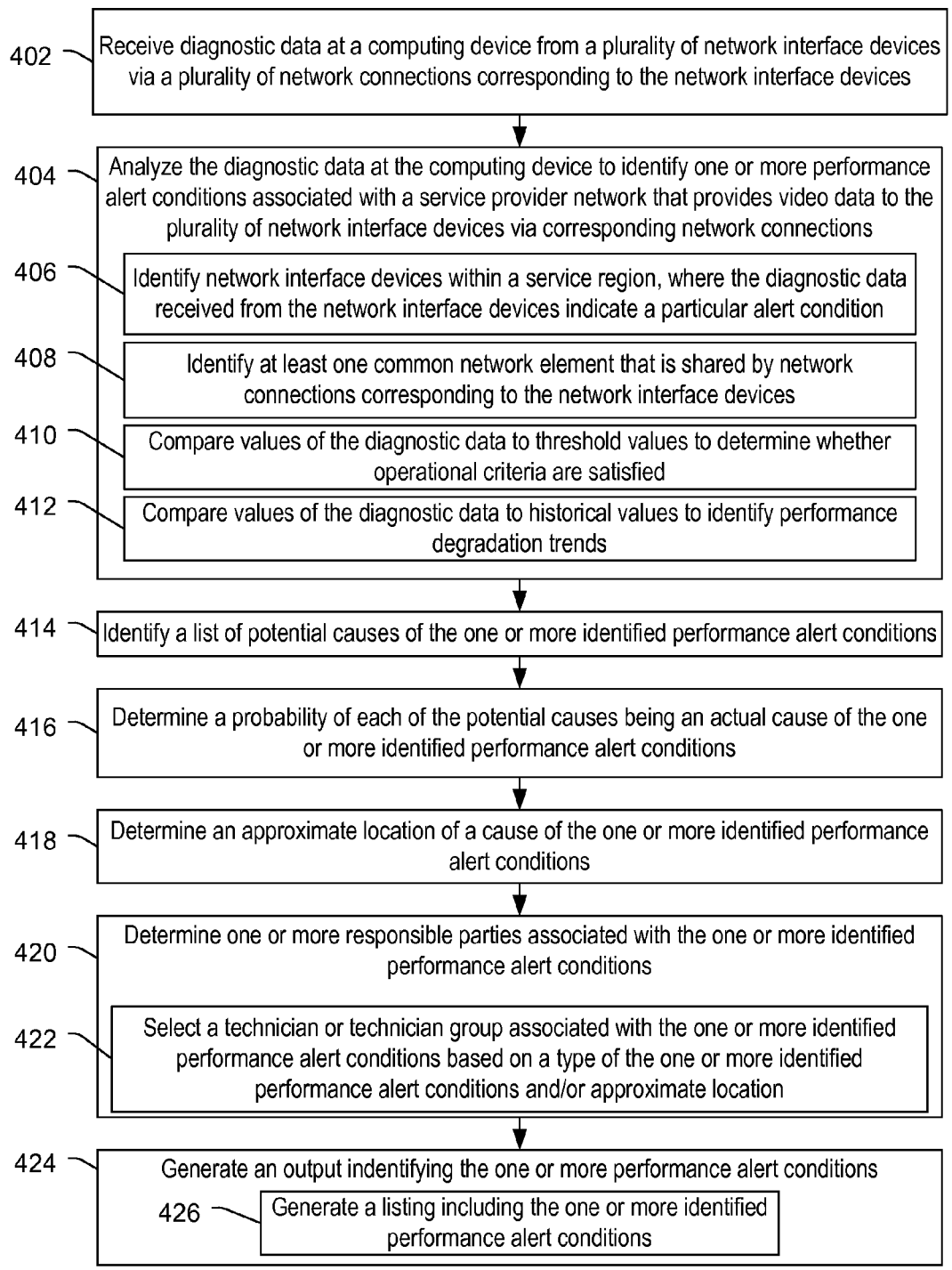
FIG. 4 is a flow chart of an embodiment of a method to identify network performance alert conditions.

FIG. 4 is a flow chart of an embodiment of a method to identify network performance alert conditions. The method includes, at 402, receiving diagnostic data at a computing device from a plurality of network interface devices via a plurality of network connections corresponding to the network interface devices. To illustrate, the computing device may be coupled to a communication network associated with the network interface devices, such as a triple-play communications network. For example, the computing device may include or be included within the computing device 102 of FIG. 1, or the computing device 280 of FIG. 2.

The network interface devices may be network interface devices such as the network interface devices 110, 112, 114, and 116 of FIG. 1, the network interface device 201 of FIG. 2 or the network interface device 302 of FIG. 3. The network interface devices may be coupled to user devices at corresponding user locations. For example, the user devices may include video devices (e.g., set-top box devices, game consoles, televisions, media recorders), voice devices (e.g., telephones), broadband data devices (e.g., computers, routers), or combinations thereof. The network interface devices may receive data, such as broadband data, voice data, video data, or any combination thereof, from a central office via one or more intermediate network elements, such as a remote terminal or cross-connect box.

In a particular embodiment, each of the plurality of network interface devices includes a diagnostic module, such as the diagnostic module 271 of FIG. 2 or the diagnostic module 338 of FIG. 3. The diagnostic module may gather diagnostic data that pertains to the network interface device, diagnostic data that pertains to a corresponding network connection (that is, a network connection from a particular network interface device to the communications network), diagnostic data that pertains to a device at the user location (such as a video device, a telecommunication device, a broadband data device or a computing device) associated with the network interface device, other diagnostic data, or any combination thereof. An example of the diagnostic data may include data indicating a number of dropped packets at the particular network interface device during a specified time period. Another example of the diagnostic data may include results of loopback testing performed with respect to the one or more user devices that are coupled to the particular network interface device. For example, a particular network interface device may perform loopback testing at the user location to identify performance conditions. Another example of the diagnostic data may include results of loopback testing performed with respect to the network connection corresponding to the particular network interface device. Another example of the diagnostic data may include data indicative of bandwidth available to the particular network interface device via the network connection corresponding to the particular network interface device.

Another example of the diagnostic data may include data descriptive of signal characteristics of a signal received via the network connection corresponding to the particular network interface device. For example, the signal may be a communication signal that is modulated to a particular frequency that is used for broadband, video, voice or data communications. The signal characteristics may include signal noise, frequency, signal strength, other characteristics that may be useful to identify line faults, or any combination thereof.

Another example of the diagnostic data may include data indicative of line characteristics of a physical link of the network connection corresponding to the particular network interface device. For example, the data indicative of line characteristics may include data indicative of resistance of one or more wires of the physical link, results of time-domain reflectometry tests performed on the physical link, results of other tests of line characteristics, indications of line breaks, or any combination thereof.

The diagnostic data may be received periodically or occasionally from one or more of the network interface devices. For example, one or more of the network interface devices may send diagnostic data according to a schedule, such as hourly, daily, weekly, monthly or at some other interval. Additionally, or in the alternative, the diagnostic data may be received from one or more of the network interface devices in response to a stimulus. For example, the stimulus may include receipt of a request for the diagnostic data sent from the computing device to a particular network interface. To illustrate, the computing device may send the request to the particular network interface device via the connection corresponding to the particular network interface device. The computing device may send requests for diagnostic data to individual network interface devices or to sets of network interface devices, such as a set of network interface devices associated with a service region, a set of network interface devices associated with a particular subscriber, or a set of network interfaces devices that share a common network element. Thus, the computing device may use the requests to gather data to diagnosis performance conditions for various portions of a communication network from the level of individual user locations all the way up to the entire communication network.

In another example, the stimulus may include detection of an event at the particular network interface device or at a different network interface device. For example, the event may relate to line characteristics of the physical links, signal characteristics, data communication parameters (e.g., packet loss, available bandwidth, jitter), a diagnostic request from a user (e.g., a request issued from a device at the user location), other operational parameters, or any combination thereof.

The method also includes, at 404, analyzing the diagnostic data at the computing device to identify one or more performance alert conditions associated with a service provider network that provides video data, broadband data, voice data, or other data to the plurality of network interface devices via the corresponding network connections. For example, analyzing the data may include, at 406, identifying two or more network interface devices within a service region where the diagnostic data received from the two or more network interface devices indicates a particular alert condition. At least one common network element that is shared by the connections corresponding to the two or more network interface devices may be identified, at 408. To illustrate, when a device or physical link (e.g., a communication line) that is used to provide service to a set of network interface devices fails, the diagnostic data received from the network interface devices may be used to determine that a network element that is common to the set of network interface devices has a problem.

In another example, analyzing the data may include, at 410, comparing values of the diagnostic data to one or more threshold values to determine whether one or more operational criteria are satisfied. The threshold values may relate to line characteristics of the physical links, signal characteristics, data communication parameters (e.g., packet loss, available bandwidth, jitter), other operational parameters, or any combination thereof. One or more performance alert conditions may be identified when the values of the diagnostic data do not satisfy the one or more threshold values.

In still another example, analyzing the data may include, at 412, comparing values of the diagnostic data to one or more historical values to identify performance degradation trends. The historical values may relate to line characteristics of the physical links, signal characteristics, data communication parameters (e.g., packet loss, available bandwidth, jitter), other operational parameters, or any combination thereof. The historical values may be based on measurements associated with the particular network interface device, or measurements associated with a plurality of network interface devices, such as all of the network interface devices, or a subset of the network interface devices. One or more performance alert conditions may be identified when one or more performance degradation trends are identified.

The method may also include, at 414, identifying a list of potential causes of the one or more identified performance alert conditions, and, determining a probability of each of the potential causes being an actual cause of the one or more identified performance alert conditions, at 416. The list of potential causes, the probability of each being the actual cause, or both may be determined based on historical information related to the communication network. For example, after troubleshooting the communications network to identify the actual cause of a particular alert condition, a technician or other party associated with the service provider may generate a data record that links a particular set of diagnostic data to the identified actual cause. Over time, a set of actual causes and a set of diagnostic data may be generated that enable determination of probable causes of various alert conditions.

The method may also include, at 418, determining an approximate location of a cause of the one or more identified performance alert conditions. For example, the approximate location of the cause of the performance alert conditions may be determined based on the diagnostic data received from two or more of the network interface devices. To illustrate, a cause of a particular performance alert condition linked to two network interface devices may be at a common network element that is shared by the two network interface devices. Thus, the approximate location of the cause may correspond to a location of the common network element.

The method may also include, at 420, determining one or more responsible parties associated with the one or more identified performance alert conditions. For example, determining the one or more responsible parties associated with the one or more identified performance alert conditions may include, at 422, selecting a technician or technician group associated with the one or more identified performance alert conditions based on a type of the one or more identified performance alert conditions, based on the approximate location of the cause, based on other factors (such as a time of day), or any combination thereof.

The method may also include, at 424, generating an output identifying the one or more performance alert conditions. For example, the output may include a listing including the one or more identified performance alert conditions. In an illustrative embodiment, the output also includes a list of potential causes ordered according to the probability of each of the potential causes being the actual cause of the one or more identified performance alert conditions. The output may also include the approximate location of one or more of the potential causes. In a particular embodiment, the output is sent to an output device associated with the one or more responsible parties. For example, the output may be sent to a computer terminal, portable notification device (e.g., a mobile phone, pager or portable work terminal) or a printer associated with the technician or technician group responsible to address the performance alert condition.

Figure 5:
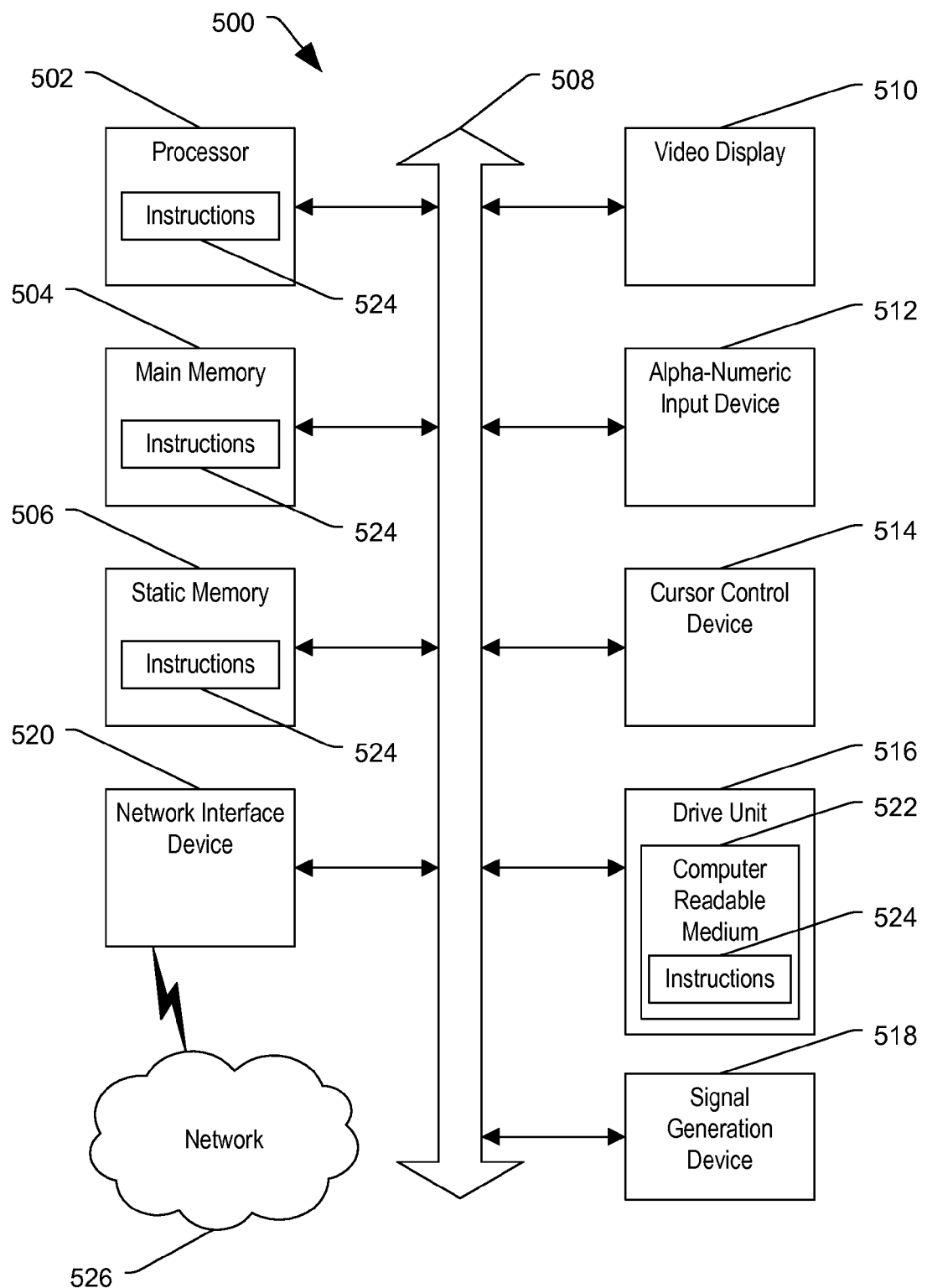
FIG. 5 is a block diagram of an embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the databases, communication networks, field units, network interface devices, computing devices, or set-top box devices discussed with reference to FIGS. 1, 2 and 3.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable storage medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable storage media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium that includes instructions 524 or receives and executes instructions 524, so that a device connected to a network 526 can communicate voice, video or data over the network 526. Further, the instructions 524 may be transmitted or received over the network 526 via the network interface device 520.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible medium that is capable of storing, encoding a set of instructions for execution by a processor or that cause a computer system to perform any one or more of the methods or operations disclosed herein.

In a particular non-limiting, exemplary embodiment, the computer-readable storage medium can include a solid-state memory such as a memory card or other package that houses one or more non-volatile read-only memories. Further, the computer-readable storage medium can be a random access memory or other volatile re-writable memory. Additionally, the computer-readable storage medium can include a magneto-optical or optical medium, such as a disk or tapes or other storage device.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, VDSL) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving performance measurements at a computing system from network interface devices;
    analyzing the performance measurements with the computing system to identify a performance alert condition, wherein the analyzing the performance measurements includes comparing values of the performance measurements to historical values to identify a performance degradation trend, and wherein the performance degradation trend corresponds to the performance alert condition in response to the performance degradation trend satisfying a threshold;
    determining, by the computing system, potential causes of the performance alert condition;
    determining, by the computing system, probabilities associated with the potential causes being actual causes of the performance alert condition; and
    generating, by the computing system, an output including a potential causes list ordered according to the probabilities associated with the potential causes being the actual causes of the performance alert condition.

2. The method of claim 1, further comprising sending the output to a device associated with a party, wherein the party is responsible for the performance alert condition.

3. The method of claim 2, wherein the party includes a technician or technician group associated with the performance alert condition based on a type of the performance alert condition.

4. The method of claim 2, further comprising determining an approximate location of a source of a potential cause of the potential causes, and wherein the party includes a technician or technician group associated with the performance alert condition based on the approximate location.

5. The method of claim 4, wherein the output includes the approximate location.

6. The method of claim 2, further comprising selecting the party based on a time of day.

7. The method of claim 1, wherein historical information of a communication network is used in determining the potential causes of the performance alert condition, is used in determining the probabilities, or both.

8. The method of claim 1, wherein analyzing the performance measurements includes comparing values of the performance measurements to threshold values to determine whether operational criteria are satisfied, and identifying the performance alert condition in response to the operational criteria not being satisfied.

9. The method of claim 1, wherein the performance measurements from a particular network interface device includes results of a loopback test performed with respect to a user device or performed with respect to a second network interface device.

10. The method of claim 1, wherein the performance alert condition is associated with a service provider network that provides media content to the network interface devices via network connections.

11. A system comprising:
    a processor;
    a memory accessible to the processor, the memory including instructions executable by the processor to cause the processor to perform operations including:
        analyzing performance measurements to identify a performance alert condition, the performance measurements received from network interface devices, wherein the analyzing the performance measurements includes comparing values of the performance measurements to historical values to identify a performance degradation trend, and wherein the performance degradation trend corresponds to the performance alert condition in response to the performance degradation trend satisfying a threshold;
        determining potential causes of the performance alert condition;
        determining probabilities associated with the potential causes being actual causes of the performance alert condition; and
        generating an output including a potential causes list ordered according to the probabilities associated with the potential causes being the actual causes of the performance alert condition.

12. The system of claim 11, wherein a portion of the performance measurements is received from a particular network interface device of the network interface devices in response to a stimulus.

13. The system of claim 12, wherein the stimulus includes a request for performance measurements.

14. The system of claim 12, wherein the stimulus includes detection of an event at the particular network interface device, detection of a second event at a different network interface device, or both.

15. The system of claim 11, wherein particular performance measurements received from a particular network interface device of the network interface devices includes data indicating a number of dropped packets at the particular network interface device during a specified time period, results of first loopback testing performed with respect to a user device coupled to the particular network interface device, results of second loopback testing performed with respect to a network connection corresponding to the particular network interface device, signal characteristics of a signal received via the network connection corresponding to the particular network interface device, line characteristics of a physical link of the network connection corresponding to the particular network interface device, bandwidth availability to the particular network interface device via the network connection corresponding to the particular network interface device, or combinations thereof.

16. The system of claim 15, wherein the line characteristics include resistance of a wire of the physical link, time-domain reflectometry results, or both.

17. A computer-readable storage device storing instructions executable by a processor to perform operations including:

analyzing performance measurements to identify a performance alert condition, the performance measurements received from network interface devices, wherein the analyzing the performance measurements includes comparing values of the performance measurements to historical values to identify a performance degradation trend, and wherein the performance degradation trend corresponds to the performance alert condition in response to the performance degradation trend satisfying a threshold;

determining a potential cause of the performance alert condition;

determining a probability associated with the potential cause being an actual cause of the performance alert condition; and generating an output including a potential causes list ordered according to probabilities associated with potential causes being actual causes of the performance alert condition, the potential causes list including the potential cause.

18. The computer-readable storage device of claim 17, wherein a diagnostic module of a particular network interface device of the network interface devices gathers particular performance measurements that pertain to a video device at a user location.

19. The computer-readable storage device of claim 17, wherein a particular network interface device includes a first network interface to terminate a communication line and a second network interface to terminate a coaxial line.

20. The computer-readable storage device of claim 17, wherein the output includes an approximate location of a source of a potential cause of the potential causes.

* * * * *